United States Patent
Valecha

(10) Patent No.: US 10,621,003 B2
(45) Date of Patent: Apr. 14, 2020

(54) WORKFLOW HANDLING IN A MULTI-TENANT CLOUD ENVIRONMENT

(71) Applicant: International Business Machines Corporation, Armonk, NY (US)

(72) Inventor: Vinod A. Valecha, Pune (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 209 days.

(21) Appl. No.: 15/475,478

(22) Filed: Mar. 31, 2017

(65) Prior Publication Data

US 2018/0285146 A1    Oct. 4, 2018

(51) Int. Cl.
G06F 9/50    (2006.01)

(52) U.S. Cl.
CPC .................. *G06F 9/5072* (2013.01)

(58) Field of Classification Search
CPC .............................. G06F 2209/483; G06F 9/48
See application file for complete search history.

(56) References Cited

U.S. PATENT DOCUMENTS

| | | | |
|---|---|---|---|
| 8,744,890 B1 * | 6/2014 | Bernier | G06Q 10/0631 705/7.16 |
| 9,825,881 B2 | 11/2017 | Johnston et al. | |
| 9,886,267 B2 | 2/2018 | Maheshwari et al. | |
| 10,419,524 B2 | 9/2019 | Schincariol et al. | |
| 2007/0016573 A1 * | 1/2007 | Nanavati | G06Q 10/06 |
| 2013/0198750 A1 * | 8/2013 | Charif | G06F 8/20 718/102 |
| 2013/0311927 A1 * | 11/2013 | Grossman | G06F 3/048 715/771 |
| 2015/0242786 A1 | 8/2015 | Abraham et al. | |
| 2016/0014042 A1 | 1/2016 | Kampas et al. | |

(Continued)

FOREIGN PATENT DOCUMENTS

EP    2439687 A1    4/2012

OTHER PUBLICATIONS

Gianpaolo Cugola, et al.,"QoS-Aware Adaptive Service Orchestrations", IEEE 19th International Conference on Web Services, ICWS, 2012, Aug. 6, 2012, p. 1-8.

*Primary Examiner* — Meng Ai T An
*Assistant Examiner* — Jorge A Chu Joy-Davila
(74) *Attorney, Agent, or Firm* — Cantor Colburn LLP; Jeffrey S LaBaw

(57) ABSTRACT

Provided herewith are embodiments related to a system, computer program product and a method for workflow handling, for example, in a cloud computing environment. Recommendations are provided to tenants regarding a replacement or improvement of activities or tasks in an orchestration workflow determined to have sub-optimal activities or tasks. The recommendation is based on a comparison of activities or tasks of a plurality of orchestrations that are deemed similar. The orchestrations deemed similar are grouped and ranked based on performance. Tenants implementing orchestrations that are ranked below the top ranked orchestration (sub-optimal) are provided with recommendations. The recommendations can be used to improve performance of the lower ranked orchestrations based on the performance of the top ranked orchestration.

11 Claims, 6 Drawing Sheets

(56) References Cited

U.S. PATENT DOCUMENTS

| | | | |
|---|---|---|---|
| 2016/0063145 A1* | 3/2016 | Chang | H04L 65/403 |
| | | | 703/6 |
| 2016/0094417 A1* | 3/2016 | Bonagiri | H04L 41/5054 |
| | | | 709/226 |
| 2016/0119357 A1 | 4/2016 | Kinsella et al. | |
| 2017/0123631 A1* | 5/2017 | Sharma | G06F 3/0482 |

* cited by examiner

US 10,621,003 B2

WORKFLOW HANDLING IN A MULTI-TENANT CLOUD ENVIRONMENT

BACKGROUND

The present invention relates to cloud computing, and more specifically, to workflow handling within a multi-tenant cloud environment. Cloud orchestration involves the end-to-end automation and coordination of multiple processes to deliver a desired service to its clients. The orchestration combines multiple tasks into workflows and ensures the performance of each of the tasks in a definite order with relation to one another, within a workflow.

Workflow engines allow a tenant to define a workflow process model and execute instances of the model to generate tasks. A process model consists of a series of tasks and events from the start of the process to its various possible termination points. The tasks could be assigned to a user or a group of users and also flagged with a due date or start date. Additionally, some workflow engines provide a mechanism to share runtime state between tasks involved in that process instance.

SUMMARY

One or more embodiments of the present invention provide a method for workflow handling, for example, in a cloud computing environment. The method can include comparing activities, tasks and/or functions (activities or operations) being performed in a cloud environment to determine if similarities exist between the occurring activities. When similarities exist, orchestrations having similar activities are grouped together and can be ranked against each other based on performance criteria. Orchestrations within the group that do not receive a top ranking are each compared to the top ranked orchestration to determine any differences performance and/or configuration. The differences in performance and/or configuration can be sent to a tenant responsible for a particular lower ranked orchestration thereby improving the performance of the lower ranked orchestration.

One or more embodiments of the present invention provide a system for workflow handling. The system can comprise one or more processors and at least one memory. Using the one or more processors and at least one memory, the system can perform a method of workflow handling. The method can include comparing activities (operations) being performed in a cloud environment to determine if similarities exist between the occurring activities. When similarities exist, orchestrations having similar activities are grouped together and can be ranked against each other based on performance criteria. Orchestrations within the group that do not receive a top ranking are each compared to the top ranked orchestration to determine any differences in performance and/or configuration. The differences in performance and/or configuration can be sent to a tenant responsible for a particular lower ranked orchestration in order to make adjustments to the lower ranked orchestration thereby improving the performance of the lower ranked orchestration.

One or more embodiments of the present invention provide a computer program product for workflow handling. The computer program product can comprise a non-transitory computer readable storage medium having program code embodied therewith. The program code is executable by a processor to perform a method of workflow handling. The method can include comparing activities being performed in a cloud environment to determine if similarities exist between the occurring activities (operations). When similarities exist, orchestrations having similar activities are grouped together and can be ranked against each other based on performance criteria. Orchestrations within the group that do not receive a top ranking are each compared to the top ranked orchestration to determine any differences in performance and/or configuration. The differences in performance and/or configuration can be sent to a tenant responsible for a particular lower ranked orchestration in order to make adjustments to the lower ranked orchestration thereby improving the performance of the lower ranked orchestration.

BRIEF DESCRIPTION OF THE DRAWINGS

The subject matter which is regarded as the invention is particularly pointed out and distinctly claimed in the claims at the conclusion of the specification. The foregoing and other features and advantages of the invention are apparent from the following detailed description taken in conjunction with the accompanying drawings in which:

DETAILED DESCRIPTION

Figure 1:
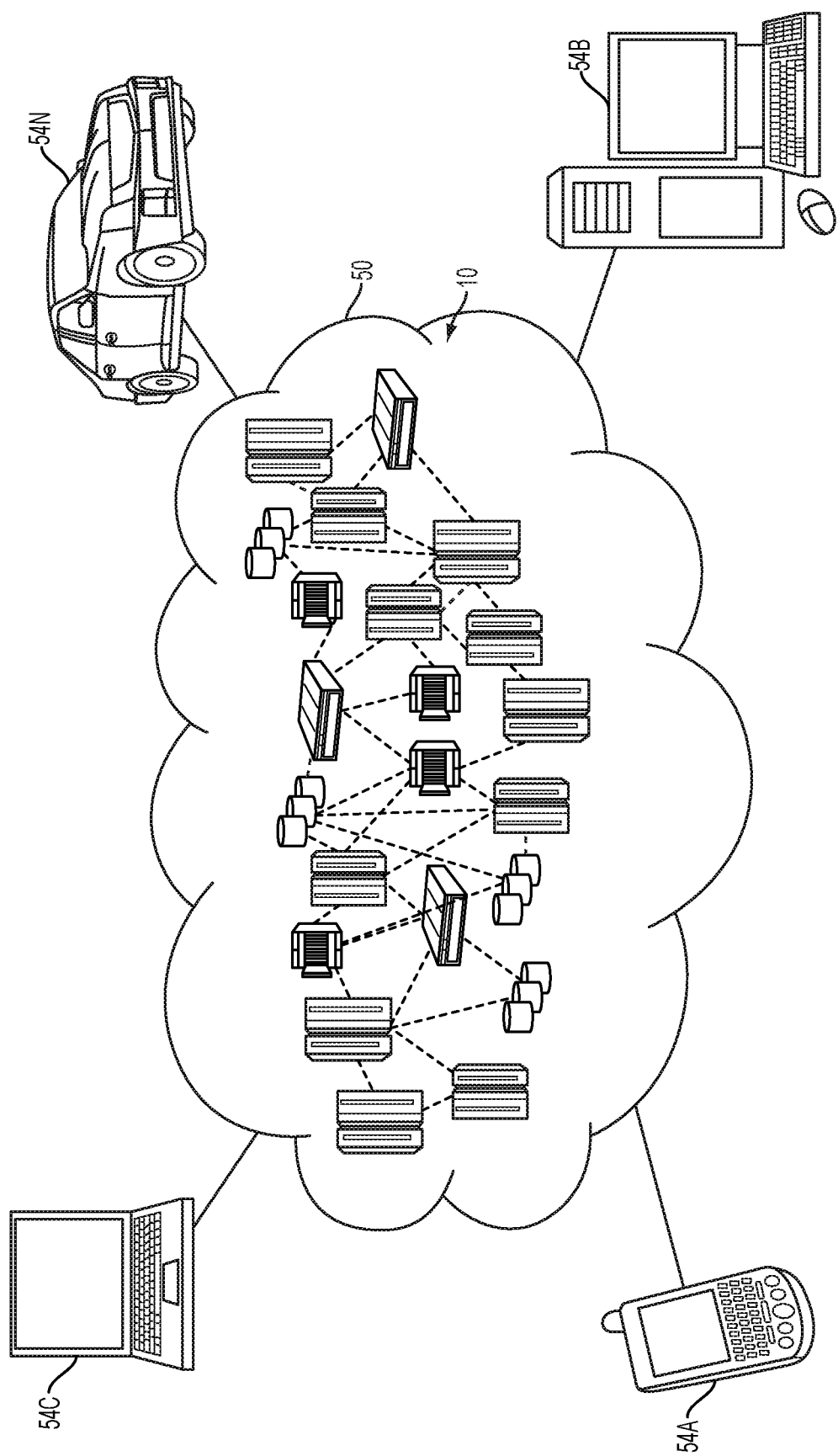
FIG. 1 depicts a cloud computing environment according to one or more embodiments of the present invention.

In accordance with exemplary embodiments of the disclosure, methods, systems and computer program products for workflow handling in a multi-tenant cloud environment are provided. In one or more exemplary embodiments, methods, systems, and computer program products for can include comparing activities, tasks and/or functions (activities or operations) being performed in a cloud environment to determine if similarities exist between the occurring activities. When similarities exist, orchestrations having similar activities are grouped together and can be ranked against each other based on performance criteria. Orchestrations within the group that do not receive a top ranking are each compared to the top ranked orchestration to determine any differences in performance and/or configuration. The differences in performance and/or configuration can be sent as a notification to a tenant responsible for a particular lower ranked orchestration. The notification can assist the tenant in improving the performance of the orchestration by providing suggested changes to their orchestration in relation to a better performing orchestration performing similar activities.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Software as a Service (SaaS): a software distribution model in which a third-party provider hosts applications and makes them available to customers over the Internet. SaaS removes the need for organizations to install and run applications on their own computers or in their own data centers. This eliminates the expense of hardware acquisition, provisioning and maintenance, as well as software licensing, installation and support.

Platform as a Service (PaaS): a cloud computing model that delivers applications over the Internet. In a PaaS model, a cloud provider delivers hardware and software tools, for example, tools needed for application development, to users as a service. A PaaS provider can host the hardware and software on the PaaS provider's infrastructure. As a result, PaaS frees users from having to install in-house hardware and software to develop or run a new application.

Database as a Service (DBaaS): a cloud-based approach to the storage and management of structured data that delivers database functionality similar to what is found in relational database management systems (RDBMSes) such as, for example, SQL Server, MySQL, and Oracle. DBaaS provides a flexible, scalable, on-demand platform oriented toward self-service and database management, particularly in terms of provisioning a business' own environment.

DBaaS systems may include monitoring engines to track performance and usage, error monitoring, and data analysis engines.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

When IaaS is used by a consumer, the consumer of the infrastructure becomes a tenant of the infrastructure. If multiple consumers exist for the infrastructure, a multi-tenant model exists. Multi-tenant implementations of SaaS, PaaS and DBaaS exist as well.

Orchestration is an automated coordination and management of computer resources and services, for example, in an IaaS, SaaS, PaaS or DBaaS. The orchestration helps fulfill multi-tenancy by provisioning workloads on tenant specific environments; deploying tenant-specific software, middleware, tooling agents or antivirus programs; hardening workloads; integrating with directory services, and so on. Tenants can be grouped based on the nature of their businesses, compliance requirements, geographical location, and/or specific needs. An orchestration workflow (orchestration) can define a logical flow of activities or tasks from a start event to an end event to accomplish a specific service. There are many activities or tasks at the tenant's disposal to accomplish a specific service.

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Because there are many activities and tasks at the consumer's disposal when creating an orchestration workflow, tenants can often use activities and tasks that do not provide an optimal orchestration workflow despite creating an orchestration workflow that does function. This can be the case with tenants who are novices in building orchestrations workflows. Although functional, sub-optimal orchestration workflows can use more memory or take more time to complete than an optimal activity or service would require resulting in decreases in performance.

Turning now to an overview of aspects of the present invention, one or more embodiments of the invention provide methods, systems and structures configured to provide recommendations to tenants regarding the replacement or improvement of activities or tasks in orchestration workflows (orchestration) determined to include sub-optimal activities or tasks. The recommendation is based on a comparison of activities or tasks of a plurality of orchestrations performed in a multi-tenant cloud environment that are deemed similar. The orchestrations having similar activities or tasks are grouped and ranked based on performance. Those orchestrations that are ranked below a top ranked orchestration are deemed sub-optimal, and a notification is sent to tenants of the multi-tenant environment using the sub-optimal orchestrations indicating differences between the activities or tasks within the top ranked orchestration and the activity or tasks in the lower ranked orchestration in which the tenant is responsible. The recommendation is provided to assist the tenant in improving the performance of the tenant's orchestration workflow.

Referring now to FIG. 1, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
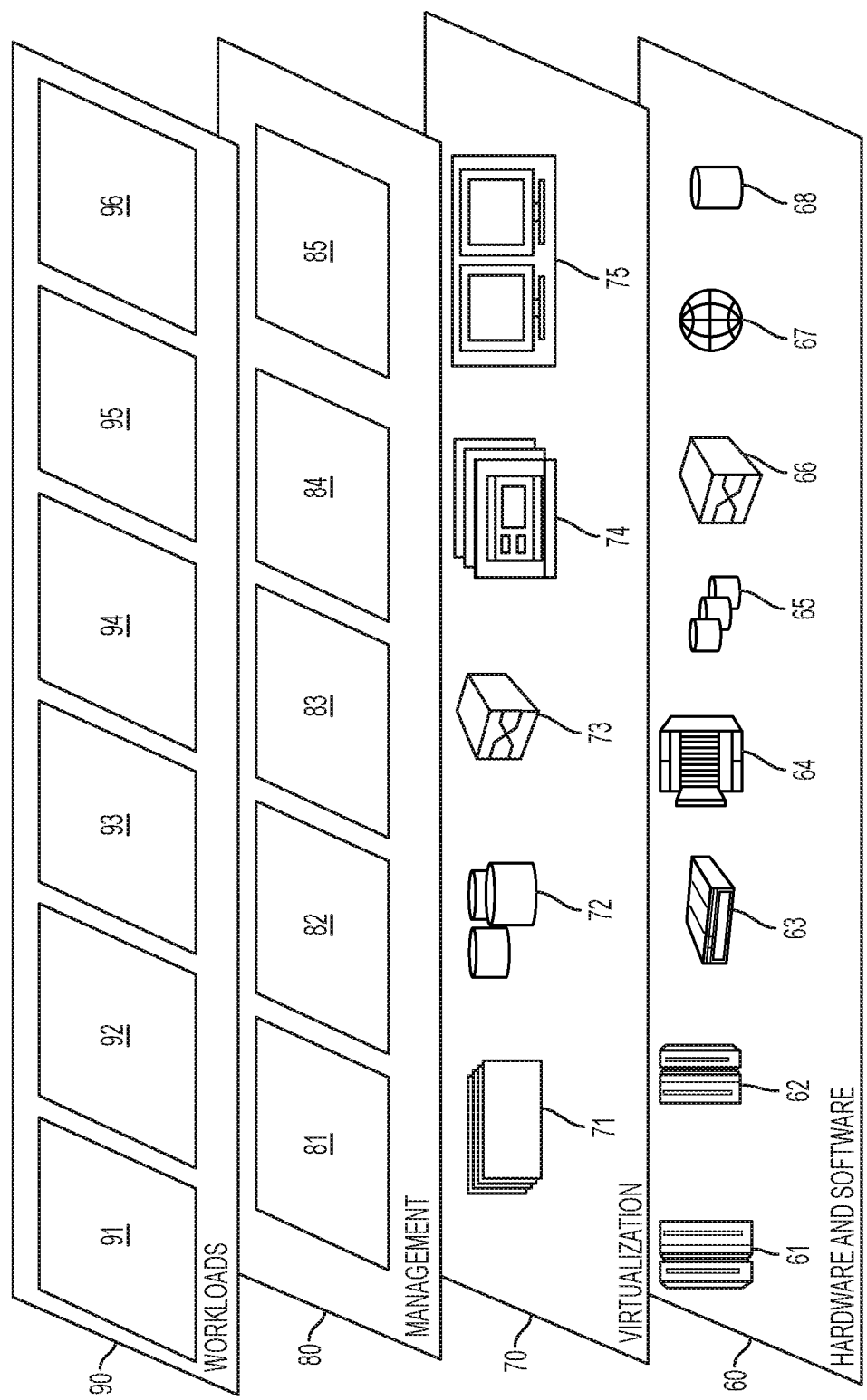
FIG. 2 depicts abstraction model layers according to one or more embodiments of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include mapping and navigation 91; software development and lifecycle management 92; virtual classroom education delivery 93; data analytics processing 94; transaction processing 95; and action analytics and notifications 96.

Figure 3:
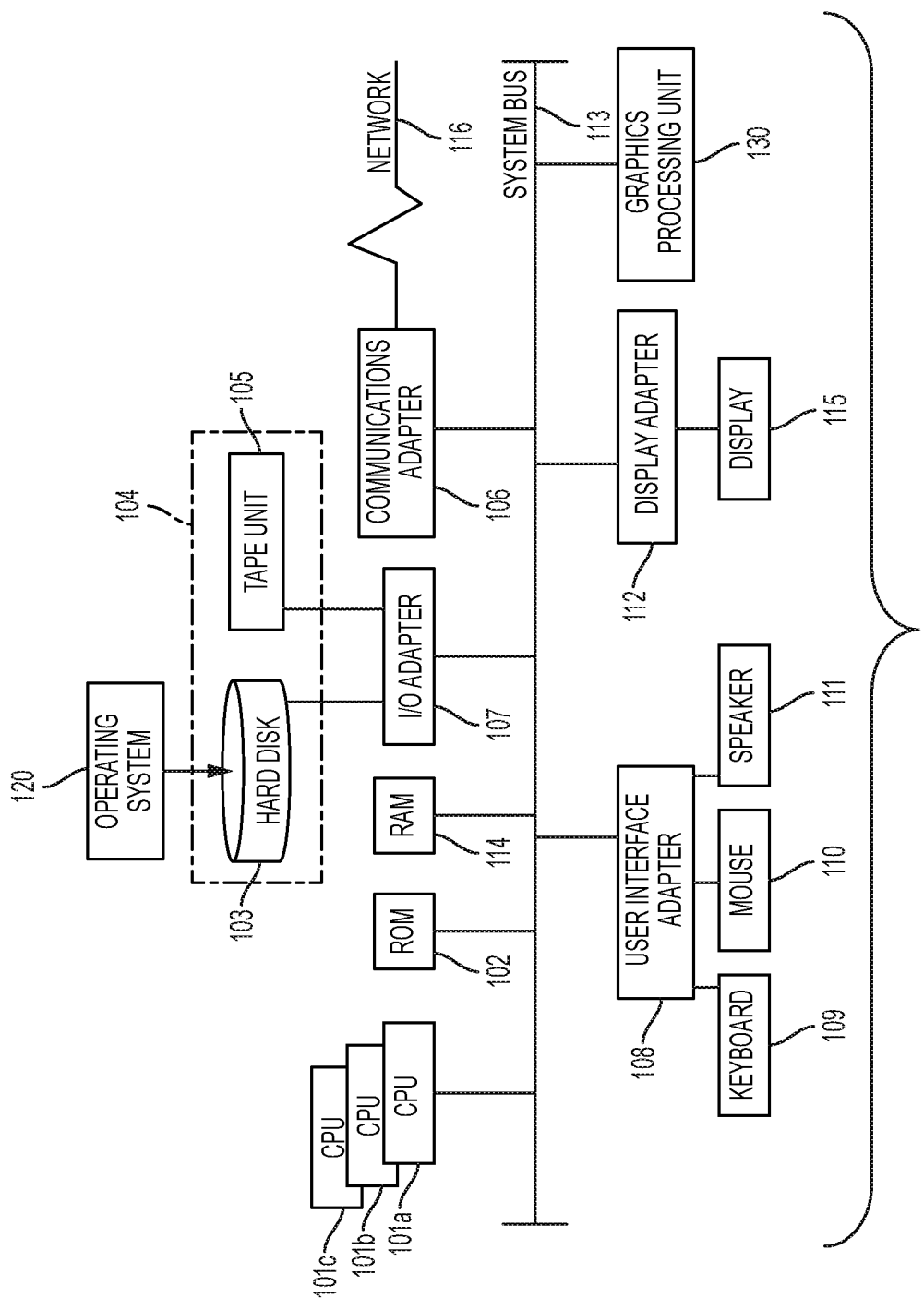
FIG. 3 illustrates a block diagram of a computer system for use in practicing the teachings herein.

Referring to FIG. 3, there is shown an embodiment of a processing system 100 for implementing the teachings herein. In this embodiment, the system 100 has one or more central processing units (processors) 101a, 101b, 101c, etc. (collectively or generically referred to as processor(s) 101). In one or more embodiments, each processor 101 may include a reduced instruction set computer (RISC) microprocessor. Processors 101 are coupled to system memory 114 and various other components via a system bus 113. Read only memory (ROM) 102 is coupled to the system bus 113 and may include a basic input/output system (BIOS), which controls certain basic functions of system 100.

FIG. 3 further depicts an input/output (I/O) adapter 107 and a network adapter 106 coupled to the system bus 113. I/O adapter 107 may be a small computer system interface (SCSI) adapter that communicates with a hard disk 103 and/or tape storage drive 105 or any other similar component. I/O adapter 107, hard disk 103, and tape storage device 105 are collectively referred to herein as mass storage 104. Operating system 120 for execution on the processing system 100 may be stored in mass storage 104. A network adapter 106 interconnects bus 113 with an outside network 116 enabling data processing system 100 to communicate with other such systems. A screen (e.g., a display monitor) 115 is connected to system bus 113 by display adaptor 112, which may include a graphics adapter to improve the performance of graphics intensive applications and a video controller. In one embodiment, adapters 107, 106, and 112 may be connected to one or more I/O busses that are connected to system bus 113 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 113 via user interface adapter 108 and display adapter 112. A keyboard 109, mouse 110, and speaker 111 all interconnected to bus 113 via user interface adapter 108, which may include, for example, a Super I/O chip integrating multiple device adapters into a single integrated circuit.

In exemplary embodiments, the processing system 100 includes a graphics processing unit 130. Graphics processing unit 130 is a specialized electronic circuit designed to manipulate and alter memory to accelerate the creation of images in a frame buffer intended for output to a display. In general, graphics processing unit 130 is very efficient at manipulating computer graphics and image processing and has a highly parallel structure that makes it more effective than general-purpose CPUs for algorithms where processing of large blocks of data is done in parallel.

Thus, as configured in FIG. 3, the system 100 includes processing capability in the form of processors 101, storage capability including system memory 114 and mass storage 104, input means such as keyboard 109 and mouse 110, and output capability including speaker 111 and display 115. In one embodiment, a portion of system memory 114 and mass storage 104 collectively store an operating system coordinate the functions of the various components shown in FIG. 3.

Figure 4:
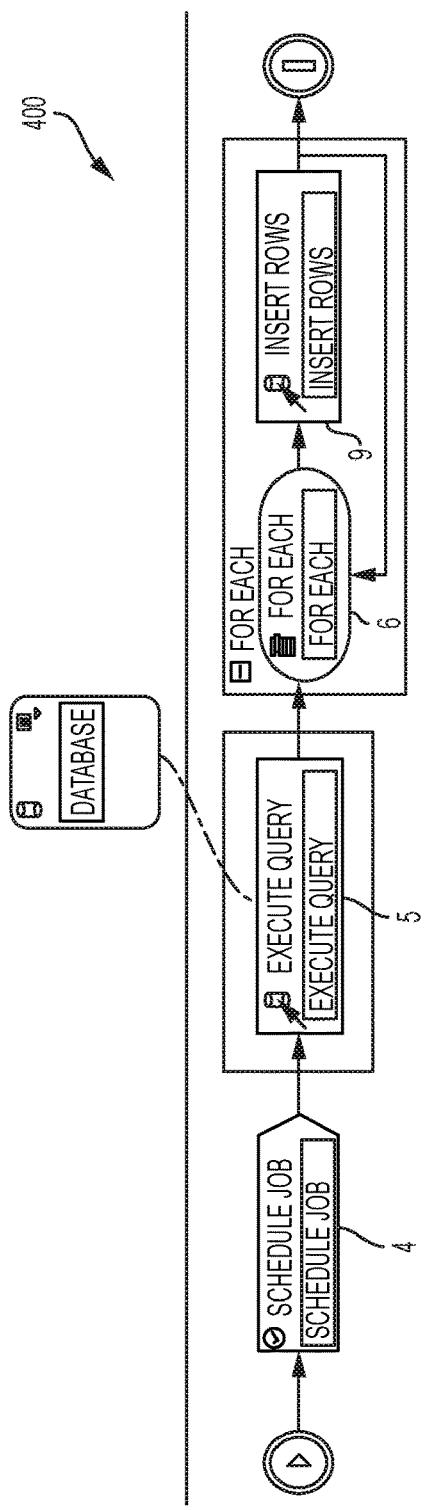
FIG. 4 illustrates a workflow for an orchestration according to one or more embodiments of the present invention.

FIG. 4 illustrates a workflow 400 for an orchestration according to one or more embodiments. In the illustrative embodiment, the workflow 400 can be developed using Cloud Integrator software, (shown and referred to herein as Studio), which is a graphical development environment that is installed on a personal computing device, for example, processing system 100. Using Studio, an integration project can be created containing one or more orchestrations. Each orchestration is built with a number of activities or tasks that define the flow of data. The details of an activity or task can be defined from the configuration panes within Studio.

A project can contain all of the assets that are required for an orchestration to run, including any file schemas, WSDL files, and functions. The project can also define connectivity to the sources of data, the endpoints. The Cloud Integrator can contain many built-in connectors to applications (for example SAP), databases, and web services that make connecting to these endpoints straightforward.

The workflow 400 can be built from a number of activities or tasks, which are listed by category in a section called studio activities in Studio. Activities or tasks can exist for all connectors and the handling workflow logic, for example, error handling.

The workflow 400 can be considered complete when all activities of the orchestration for the associated workflow are complete. The activities can include connectors to different end points like a database object, SAP, FTP, Salesforce, etc. There are also activities that perform data transformation like "read json", "write json", "read xml", "write xml", etc. Additional activities exist that assist in the implementation of business logic, for example, 'for', 'while', 'if/then loops, etc.

An inefficient or sub-optimal workflow requires more time to complete because one or more activities take more time than usual due to additional processing and/or memory usage. The cause of these activities requiring more time is often an incorrect or inefficient configuration of activities.

Workflow 400 illustrates an Execute Query activity. The Execute Query can cause an orchestration to execute a query on a database and return a set of records from the database based on the query. As illustrated, the query of workflow 400 can cause the orchestration to return all the records from a table (Employee) containing employee information, for example, employee identification (ID), in which the employee ID has a value greater than 50.

For example, a query to obtain the associated records (query 1) can be configured as follows: Select * from Employee where emp_id>50. The resulting orchestration can return all records in which the employee ID has a value greater than 50. However, query 1 includes a wildcard "*" that causes a return of column information, which is not needed. Although the retrieved information is correct, additional time is required to complete the orchestration than necessary due to the capture of the column information.

A potentially better syntax for the same query (query 2) can be configured as follows: Select emp_name from Employee where emp_id>50. Query 2 does not retrieve column information and is, therefore, more time efficient than query 1. However, the tenant may implement query 1 in their workflow instead of query 2 because the tenant may be a novice at creating an orchestration or has not discovered performance issues with the orchestration of query 1 until the orchestration is in a production environment. Accordingly, providing notifications to tenants that configurations having queries that are more efficient exists would be beneficial.

Figure 5:
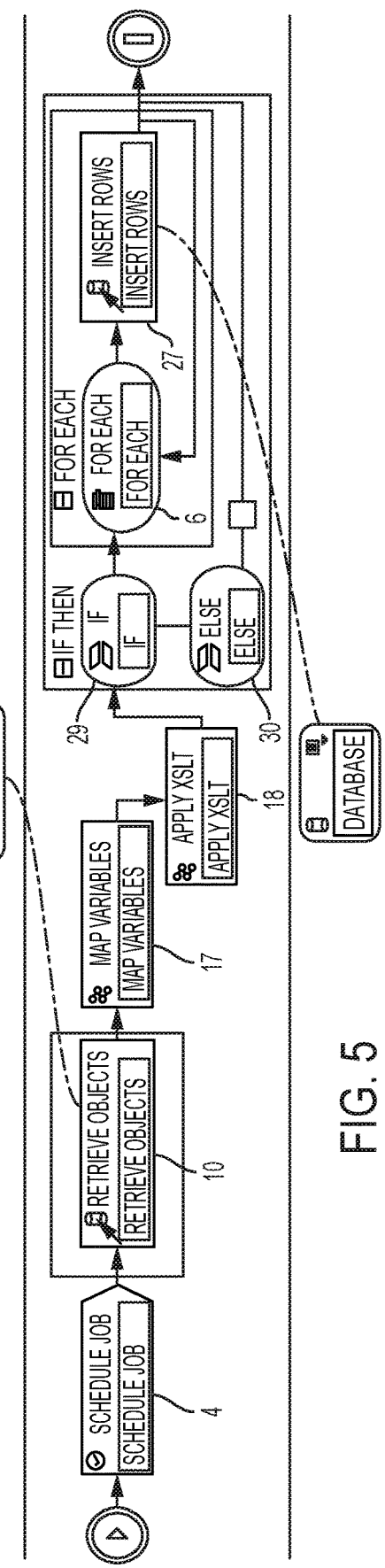
FIG. 5 illustrates a workflow for an orchestration according to one or more embodiments of the present invention.

FIG. 5 illustrates a workflow 500 for an orchestration according to one or more embodiments. In the illustrative embodiment, a Retrieve Objects activity can cause an orchestration to return, for example, SalesForceDotCom (SFDC) objects from salesforce.com, and for each retrieved object, insert a record into a database. In this exemplary workflow 500, the Retrieve Objects activity can return all the objects of a particular type from salesforce.com. If the Retrieve Objects activity returns a large set of objects from salesforce.com, a mapping of variables used to format objects in an application of an Extensible Stylesheet Language Transformations (XSLT) would be time consuming. Following the return of objects from salesforce.com, the orchestration can determine if the record contains an emp_id>50 and if the employee ID is greater than 50 insert the record into the database. Retrieving all of the objects and subsequently checking the retrieved objects to obtain a subset of the retrieved objects based on a criterion (emp_id>50) is inefficient for a large set of objects because the orchestration performs more steps than needed because the orchestration includes an inefficient syntax, for example, an if then loop.

Figure 6:
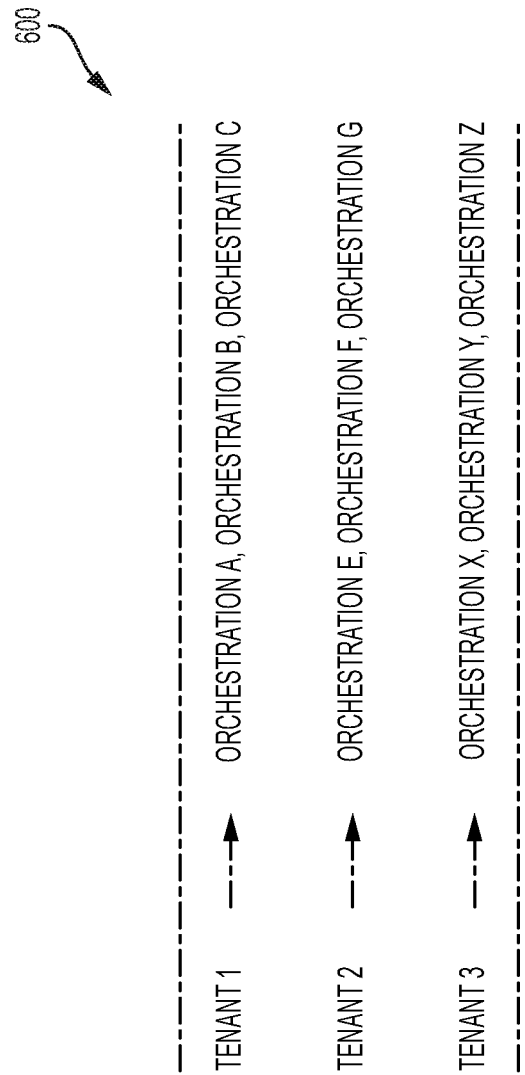
FIG. 6 illustrates a multi-tenant cloud environment according to one or more embodiments of the present invention.

FIG. 6 illustrates a multi-tenant cloud environment 600 according to one or more embodiments. The multi-tenant cloud environment 600 has multiple tenants, for example, Tenant 1, Tenant 2, and Tenant 3. Additional tenants can be deployed in environment 600 that are associated with Tenant 1, Tenant 2, and Tenant 3 or not associated with Tenant 1, Tenant 2, and Tenant 3. Each tenant of environment 600 can implement one or more orchestrations, for example, Orchestration A, Orchestration B, Orchestration F and Orchestration Z.

In environment 600, the orchestrations of Tenant 1, Tenant 2, and Tenant 3 (tenants) can be checked to determine if similarities exist based on behavioral tasks and activities associated with each orchestration using an environment manager, for example, a cloud integrator tool. Accordingly, orchestrations performing similar activities and/or tasks can be grouped together. In addition, the performance of each orchestration within each group is determined. Performance can be determined according to at least one of a plurality of criteria, for example, memory usage, CPU consumption, the time required for completion of an orchestration, etc. The orchestration exhibiting the best performance within the associated group is assigned a rank of, for example, 1. Other orchestrations within the group are also ranked based on their performance in comparison to the performance of other orchestrations within the group, for example, rank 2, rank 3, etc.

For example, Orchestration A of Tenant 1 can be determined to match in functionality with Orchestration F and Orchestration Z, i.e., performing similar activities and/or tasks. Accordingly, the environment manager of environment 600 groups Orchestrations A, F, and Z together -->G1 (A, F, Z). The environment manager compares each orchestration in the group G1(A, F, Z) based on, for example, memory usage, CPU consumption, and time to complete the orchestration, to determine the performance of each orchestration.

As an example, the environment manager determines that Orchestration F performs better as compared to Orchestrations A and Z. The environment manager then examines each of the Orchestrations, A and Z, further to determine which activities and/or tasks within Orchestrations A and Z are responsible for a decrease in performance as compared to Orchestration F. The environment manager can also detect configuration differences between the orchestrations that can enhance performance for Orchestrations A and Z.

Subsequent to the exemplary group performance determinations by the environment manager, the environment manager can separately provide Tenant 1 and Tenant 3, who use Orchestrations A and Z, respectively, with a notification that activities and/or tasks within their orchestration can be changed to enhance the performance of their orchestration. The notification can include suggested changes to an orchestration, for example, replace activities/tasks with more efficient activities/tasks, or add to or remove a portion of the orchestration, or alter the configuration of the orchestration.

As additional orchestrations are added to or removed from environment 600, the makeup of an orchestration grouping can change, for example, G1(A, F, J, Z). Accordingly, the environment manager will determine if modifications to the orchestration group alter which orchestration has the best group performance. The environment manager can provide updated notifications to the modified group.

Figure 7:
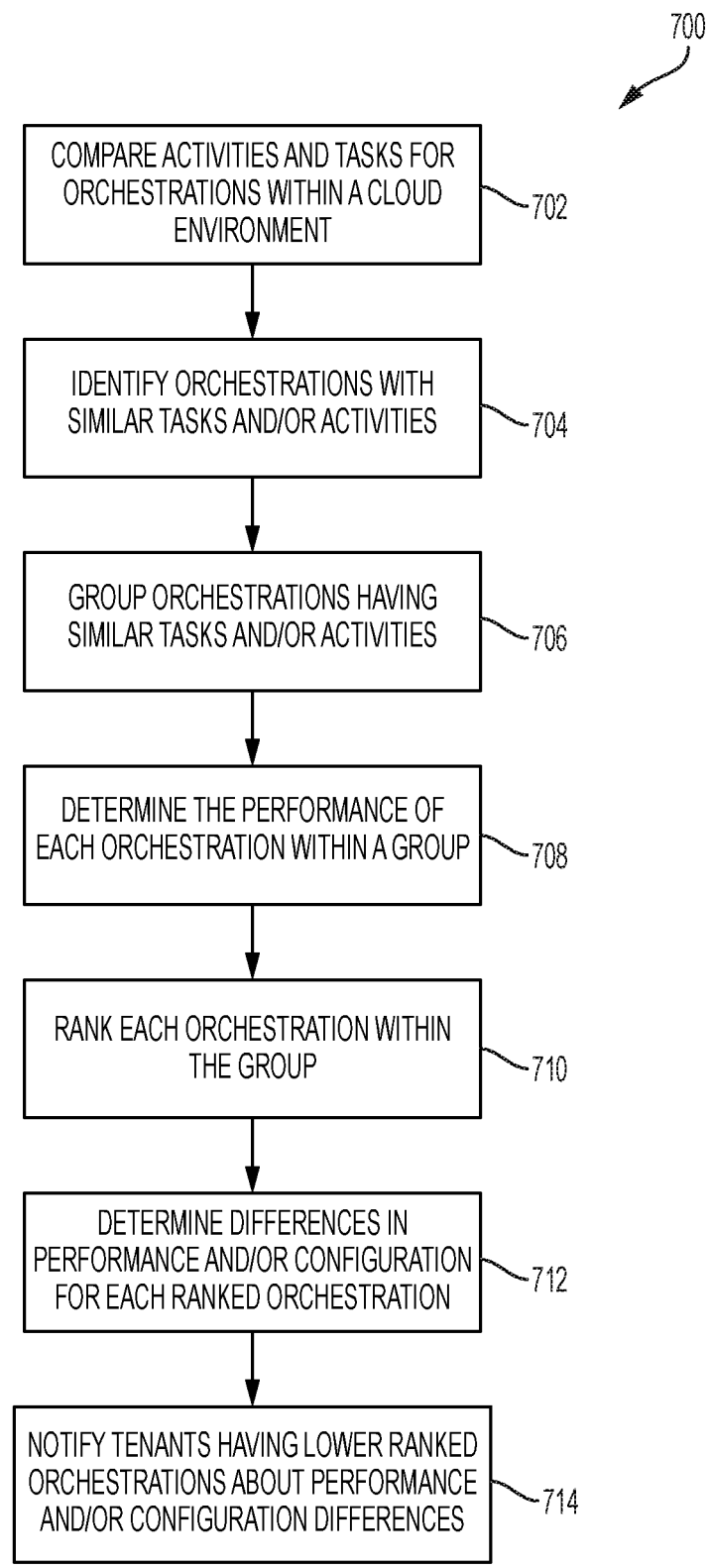
FIG. 7 is a flow diagram illustrating a method for workflow handling according to one or more embodiments of the present invention.

FIG. 7 is a flow diagram 700 illustrating a method of workflow handling according to one or more embodiments. At block 702, an environment manager compares activities and/or tasks for orchestrations operating within a multi-tenant cloud environment. At block 704, the environment manager identifies which orchestrations have similar activities and/or tasks. At block 706, the environment manager groups orchestrations having similar activities and/or tasks. At block 708, the environment manager determines a performance for each orchestration within a group. At block 710, the environment manager determines a ranking for each orchestration within a group based on the determined performance. At block 712, the environment manager determines performance and/or configuration differences between a top ranked orchestration and other orchestrations within the same grouping of orchestrations. At block 714, the environment manager provides notifications to the tenants implementing orchestrations that are ranked lower than the top ranked orchestration that includes orchestration modification suggestions for example, replace activities/tasks with more efficient activities/tasks, add to, remove a portion of the orchestration, or alter the configuration of the orchestration. It should be understood that the processes depicted in FIG. 7 represent illustrations, and that other processes may be added or existing processes may be removed, modified, or rearranged without departing from the scope and spirit of the present disclosure.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting-data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method comprising:
    comparing each operation within an orchestration of a plurality of orchestrations operating within a cloud environment to other operations of the plurality of orchestrations;
    grouping orchestrations based on a similarity of operations within each orchestration;
    determining performance criteria for each orchestration within a group, wherein the performance criteria is based on at least one of: memory usage, CPU consumption, and a time required for completion of an orchestration;
    ranking each orchestration within the group based on the performance criteria;
    determining differences in operations between a highest ranked orchestration and a lower ranked orchestration in the group, wherein the determined difference includes an identification of a candidate operation for replacement in the lower ranked orchestration and a suggested replacement operation;
    notifying a tenant of the lower ranked orchestration about the determined difference between the operation of the highest ranked orchestration and the operation of a lower ranked orchestration specific to the tenant and the suggested replacement operation;
    wherein the suggested replacement operation is at least one of: replace operations within the lower ranked orchestration with operations determined to be more efficient by an environment manager based on the highest ranked orchestration, add to or remove a portion of the lower ranked orchestration, and alter a configuration of the operations in the lower ranked orchestration;
    wherein replacement of the candidate operation with the suggested replacement operation improves the performance criteria of the lower ranked orchestration; and
    selecting by the tenant of the lower ranked orchestration the suggested replacement operation and implementing the suggested replacement operation on the lower ranked orchestration.

2. The computer-implemented method of claim 1 further comprising updating the ranking when orchestrations are added to or removed from the group.

3. The computer-implemented method of claim 1, wherein a notification contains orchestration change suggestions based on the determined difference in operation.

4. The computer-implemented method of claim 1, wherein the cloud environment is a multi-tenant cloud environment.

5. A system for workflow handling, comprising:
    one or more processors; and
    at least one memory, the memory including instructions that, upon execution by at least one of the one or more processors, cause the system to perform a method for workflow handling, the method comprising:
    comparing each operation within an orchestration of a plurality of orchestrations operating within a cloud environment to other operations of the plurality of orchestrations;
    grouping orchestrations based on a similarity of operations within each orchestration;
    determining performance criteria for each orchestration within a group, wherein the performance criteria is based on at least one of: memory usage, CPU consumption, and a time required for completion of an orchestration;
    ranking each orchestration within the group based on the performance criteria;
    determining differences in operations between a highest ranked orchestration and a lower ranked orchestration in the group, wherein the determined difference includes an identification of a candidate operation for replacement in the lower ranked orchestration and a suggested replacement operation;
    notifying a tenant of the lower ranked orchestration about the determined difference between the operation of the highest ranked orchestration and the operation of a lower ranked orchestration specific to the tenant and the suggested replacement operation;
    wherein the suggested replacement operation is at least one of: replace operations within the lower ranked orchestration with operations determined to be more efficient by an environment manager based on the highest ranked orchestration, add to or remove a portion of the lower ranked orchestration, and alter a configuration of the operations in the lower ranked orchestration;

wherein replacement of the candidate operation with the suggested replacement operation improves the performance criteria of the lower ranked orchestration; and selecting by the tenant of the lower ranked orchestration the suggested replacement operation and implementing the suggested replacement operation on the lower ranked orchestration.

6. The system of claim 5 further comprising updating the ranking when orchestrations are added to or removed from the group.

7. The system of claim 5, wherein the cloud environment is a multi-tenant cloud environment.

8. A computer program product for workflow handling, the computer program product comprising:

a computer readable storage medium having stored thereon first program instructions executable by a processor to cause the processor to:

compare each operation within an orchestration of a plurality of orchestrations operating within a cloud environment to other operations of the plurality of orchestrations;

group orchestrations based on a similarity of operations within each orchestration;

determine performance criteria for each orchestration within a group, wherein the performance criteria is based on at least one of: memory usage, CPU consumption, and a time required for completion of an orchestration;

rank each orchestration within the group based on the performance criteria;

determine differences in operations between a highest ranked orchestration and a lower ranked orchestration in the group, wherein the determined difference includes an identification of a candidate operation for replacement in the lower ranked orchestration and a suggested replacement operation;

notify a tenant of the lower ranked orchestration about the determined difference between the operation of the highest ranked orchestration and the operation of a lower ranked orchestration specific to the tenant and the suggested replacement operation;

wherein the suggested replacement operation is at least one of: replace operations within the lower ranked orchestration with operations determined to be more efficient by an environment manager based on the highest ranked orchestration, add to or remove a portion of the lower ranked orchestration, and alter a configuration of the operations in the lower ranked orchestration;

wherein replacement of the candidate operation with the suggested replacement operation improves the performance criteria of the lower ranked orchestration; and select by the tenant of the lower ranked orchestration the suggested replacement operation and implementing the suggested replacement operation on the lower ranked orchestration.

9. The computer program product of claim 8, wherein the instructions are further executable by a processor to cause the processor to update the ranking when orchestrations are added to or removed from the group.

10. The computer program product of claim 8, wherein a notification contains orchestration change suggestions based on the determined difference in operation.

11. The computer program product of claim 8, wherein the computer program product is used in a multi-tenant cloud environment.

* * * * *